(12) United States Patent
Paniconi et al.

(10) Patent No.: US 7,596,243 B2
(45) Date of Patent: Sep. 29, 2009

(54) EXTRACTING A MOVING OBJECT BOUNDARY

(75) Inventors: Marco Paniconi, Campbell, CA (US); James J. Carrig, San Jose, CA (US); Zhourong Miao, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 596 days.

(21) Appl. No.: 11/229,285

(22) Filed: Sep. 16, 2005

(65) Prior Publication Data

US 2007/0065025 A1 Mar. 22, 2007

(51) Int. Cl.
*G06K 9/00* (2006.01)
(52) U.S. Cl. ...................................... 382/107
(58) Field of Classification Search ......... 382/103–107, 382/241, 157–159, 209, 199, 181, 266; 348/403, 348/405, 413, 416, 606, 607, 620, 667, 699; 706/20, 25
See application file for complete search history.

(56) References Cited

U.S. PATENT DOCUMENTS

| | | | |
|---|---|---|---|
| 4,922,341 A | 5/1990 | Strobach | |
| 5,047,850 A | 9/1991 | Ishii et al. | |
| 5,654,771 A | 8/1997 | Tekalp | |
| 5,818,536 A | 10/1998 | Morris et al. | |
| 5,872,866 A | 2/1999 | Strongin et al. | |
| 5,974,188 A | 10/1999 | Benthal | |
| 6,178,205 B1 | 1/2001 | Cheung et al. | |
| 6,208,692 B1 | 3/2001 | Song et al. | |
| 6,212,235 B1 | 4/2001 | Nieweglowski et al. | |
| 6,259,802 B1 * | 7/2001 | Jolly et al. ................. 382/103 | |
| 6,466,624 B1 | 10/2002 | Fogg | |
| 6,480,615 B1 * | 11/2002 | Sun et al. .................... 382/103 | |
| 6,590,934 B1 | 7/2003 | Kim | |
| 6,591,015 B1 | 7/2003 | Yasunari et al. | |

(Continued)

FOREIGN PATENT DOCUMENTS

WO   WO 00/16563 A1   3/2000

(Continued)

OTHER PUBLICATIONS

Leymarie et al, Tracking Deformable Objects in the Plane Using an Active Contour Model, IEEE Trans. on Pattern Analysis and Mach. Intel., vol. 15 No. 6, Jun. 1993, pp. 617-634.

(Continued)

*Primary Examiner*—Samir A. Ahmed
*Assistant Examiner*—Atiba O Fitzpatrick
(74) *Attorney, Agent, or Firm*—Blakely, Sokoloff, Taylor & Zafman LLP

(57) ABSTRACT

A method of extracting a moving object boundary includes estimating an initial motion vector for an object whose motion is represented by a change in position between a target image and a reference image, estimating an initial vector for a background area over which the object appears to move, using the estimated vectors to find a first iteration of a dynamical model solution, and completing at least one subsequent iteration of the dynamical model solution so as to extract a boundary of the object.

22 Claims, 13 Drawing Sheets

U.S. PATENT DOCUMENTS

| | | |
|---|---|---|
| 6,608,865 B1 | 8/2003 | Itoh |
| 6,690,729 B2 | 2/2004 | Hayashi |
| 6,754,269 B1 | 6/2004 | Yamaguchi et al. |
| 6,765,965 B1 | 7/2004 | Hanami et al. |
| 6,782,054 B2 | 8/2004 | Bellers |
| 6,864,994 B1 | 3/2005 | Harrington |
| 2004/0057517 A1 | 3/2004 | Wells |
| 2004/0062307 A1 | 4/2004 | Hallapuro et al. |
| 2004/0131267 A1 | 7/2004 | Adiletta et al. |
| 2004/0233991 A1 | 11/2004 | Sugimoto et al. |
| 2005/0100092 A1 | 5/2005 | Sekiguchi et al. |
| 2005/0135483 A1 | 6/2005 | Nair |

FOREIGN PATENT DOCUMENTS

| | | |
|---|---|---|
| WO | WO 01/78402 A1 | 10/2001 |
| WO | WO 02/37859 A2 | 5/2002 |
| WO | WO 0237859 * | 5/2002 |
| WO | WO 2004/047454 A1 | 6/2004 |
| WO | WO 2005/069629 A1 | 7/2005 |

OTHER PUBLICATIONS

Reshef et al, Low Bit-Rate Video Coding Using Iterave Affine Motion Estimation and Quadtree Segmentation, Proc. Int'l Conf. on Dig. Signal Processing, Jun. 1995 pp. 427-431.

Chang et al, Simultaneous Motion Estimation and Segmentation, IEEE Transactions on Image Processing, vol. 6 No. 9, Sep. 1997, pp. 1326-1333.

Zhang et al, Image Sequence Segmentation Using 3-D Structure Tensor and Curve Evolution, IEEE Trans. on Circuits and Sys. For Video Tech., vol. 11 No. 5, May 2001, pp. 629-640.

Orchard et al, Overlapped Block Motion Compensation: An Estimation-Theoretic Approach, IEEE Transactions on Image Processing, vol. 3 No. 5, Sep. 1994, pp. 693-699.

Du et al, Two Dimensional Hierarchical Mesh Based Video Compression Techniques, 6th Int'l Symposium on DSP for Communication Systems, 2002, Sydney Australia, pp. 247-252.

International Search Report, PCT/US06/34968, 1 pg., Sep. 18, 2007, 1 pg.

International Search Report, PCT/US06/36121, Sep. 14, 2007, 1 pg.

* cited by examiner

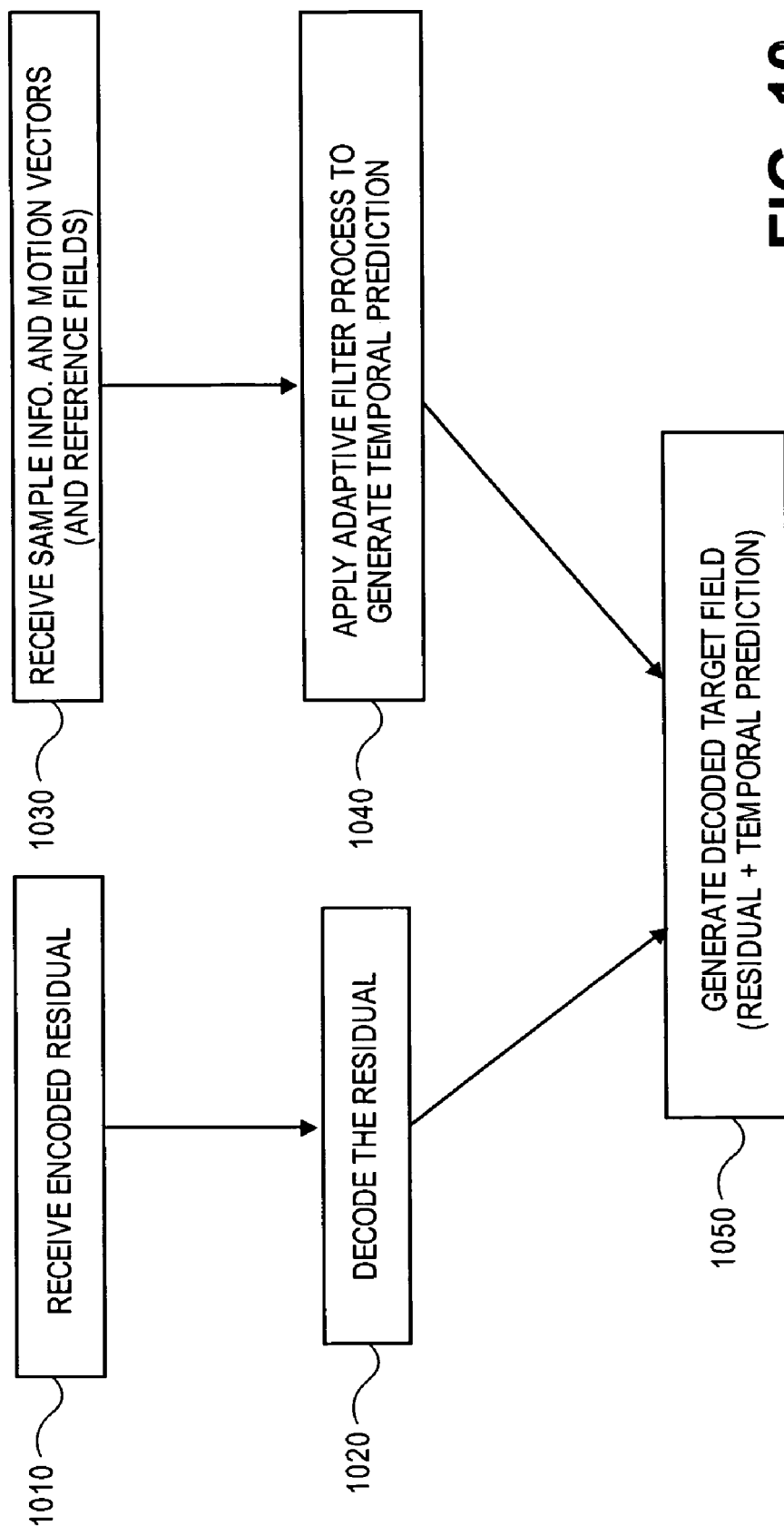

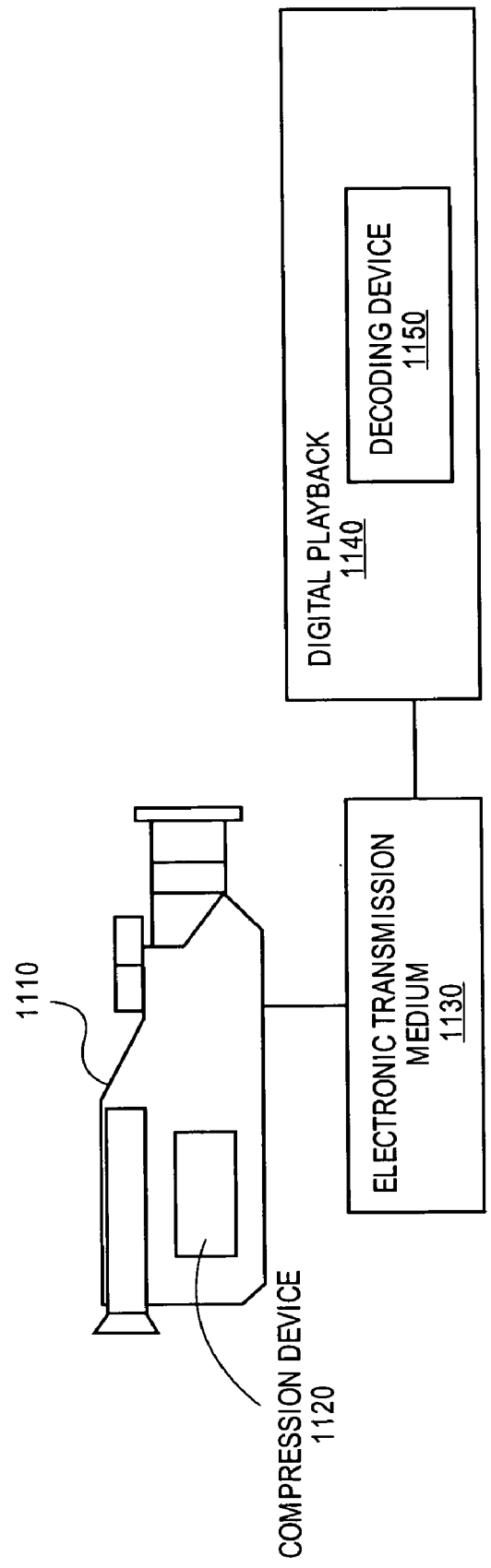

EXTRACTING A MOVING OBJECT BOUNDARY

FIELD OF INVENTION

The invention is related to the field of video compression.

BACKGROUND

Moving object extraction methods are traditionally used in video compression techniques to extract a contour of a moving object in a video sequence. Traditional methods often explicitly introduce a model to extract the contour. These traditional methods can have significant problems such as discretization of the contour and difficulty controlling the length and curvature as the contour evolves.

For example, simple segmentation of a motion block can be performed to capture multiple moving objects so as to reduce the prediction error. This process can be achieved by using a quadtree segmentation of a block having a large prediction error into sub-blocks for improved motion estimation. The block having the large prediction error is typically quadtree segmented using a straight line model of the moving object's boundary.

Other approaches in motion segmentation rely on optical flow estimates or parametric (i.e., affine) motion models. These approaches have problems, such as occlusion effects, near object boundaries. Some degree of smoothness in the segmentation field, and hence in object boundaries, can be achieved using MAP/Bayesian methods, which include a prior probability term. These methods constrain the connectivity of the segmentation field without any explicitly coupled model to account for the object boundary and motion fields.

In some conventional approaches, a curvature evolution model is used to capture the moving object boundary. However, these approaches do not involve motion estimations, and they rely only on a temporal difference operator in the model for object boundary evolution.

There is a need for a moving object extraction method that performs a region competition so as to grow the object from an initial condition, and to reach a state that provides a balance among prediction error reduction, boundary stability (i.e., no holes in the object, and a smoothness to the contour), and a coupling to image features.

SUMMARY

A method of extracting a moving object boundary includes estimating an initial motion vector for an object whose motion is represented by a change in position between a target image and a reference image, estimating an initial vector for a background area over which the object appears to move, using the estimated vectors to find a first iteration of a dynamical model solution, and completing at least one subsequent iteration of the dynamical model solution so as to extract a boundary of the object.

BRIEF DESCRIPTION OF THE DRAWINGS

The present invention is illustrated by way of example and may be better understood by referring to the following description in conjunction with the accompanying drawings, in which:

FIG. 10 shows an example of decoding a image (or frame, or image) of video data.

FIG. 11 shows an example of a system that uses the method of extracting a moving object boundary.

DETAILED DESCRIPTION

In the following description, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. For example, skilled artisans will understand that the terms field or frame or image that are used to describe the various embodiments are generally interchangeable as used with reference to video data.

An object extraction method estimates the contours of a moving foreground object represented in video images by using a dynamical model to evolve the boundary of the object. The dynamical model allows compact and coherent structures to emerge. In some embodiments, the dynamical model uses a two-dimensional boundary field, which is defined at each pixel in the image so that no constrained or parameterized boundary model is needed, to extract the object boundary. The dynamical model also uses a local object motion field to provide motion vectors along the boundary that account for non-rigid motion of the object. The dynamical model incorporates a diffusion term and an annealing term to couple the boundary to image gradient features. The object extraction method performs a hypothesis testing of past and future prediction errors so as to minimize errors caused by occlusion. The method allows object motion vectors at the boundary of the object to handle more complex local object motion. The method can be used in motion segmentation or video coding applications to generate motion vector sampling for improved temporal prediction of a target image.

Figure 1:
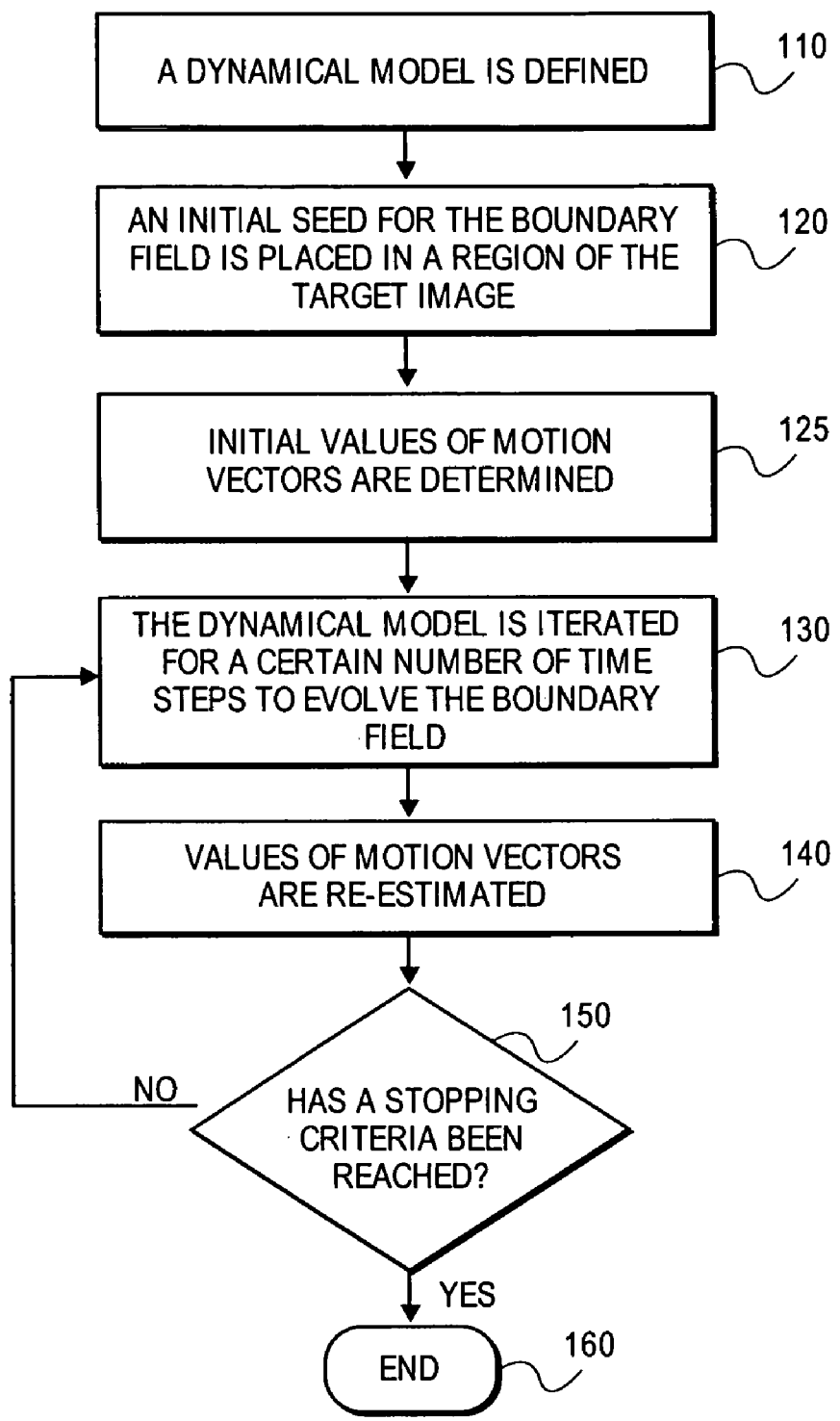
FIG. 1 shows an example of a method of extracting a moving object boundary from a background region.

An example of a method of extracting a moving object boundary from a background region extracts a contour of a single object from the background is shown in FIG. 1. At 110, a dynamical model is defined. At 120, an initial seed for the boundary field is placed in a region of the target image. At 125 initial values of motion vectors are determined. At 130, a state of the dynamical model is advanced by a time step to evolve the boundary field. At 140, motion vectors representing the background and the moving object are re-estimated. At 150, the method determines whether a stopping criterion has been reached. If so, the method ends at 160. Otherwise, the method returns to 130.

Dynamical Model for the Boundary Field

A dynamical model of a two-dimensional boundary field B(x, y) is defined, where B is a value for a pixel at location (x, y) in the image. A positive value of B indicates that the corresponding pixel is within an object, and a negative value indicates that the pixel is in the background. The method starts with an initial condition for B(x, y) and iteratively evolves the boundary field to form a better estimate of the object boundary.

In some embodiments, the method evolves the boundary field by numerically solving the dynamical model and advancing it forward in time. The boundary field is then expressed as a function of time, B(x, y, t), where the initial condition $B_o(x, y)$ starts at an initial time of 0, such that $$B_o(x,y) = B(x,y,t=0).$$

The initial condition is $$B_o(x,y) \sim 1$$

for a region within an object, and $$B_o(x,y) \sim -1$$

elsewhere, with a gradual transition between the two states. The initial condition may also be seeded with prior knowledge about the object boundary to improve performance, if such knowledge is available. In some embodiments, the initial value for the boundary field is:

$$B_o(x,y) = -\frac{1}{2} + \exp(-a((x-x_o)^2 + (y-y_0)^2))$$

where $(x_o, y_o)$ is the center of the seed, and a measures the size of the seed.

The method grows the seed around a gradient $\nabla$ of the boundary field B(x, y), where B(x, y)~0, using an evolution equation:

$$\partial_t B(x,y,t) = T|\nabla B(x,y)| \quad (1)$$

to evolve the dynamical model according to:

$$B(x,y,t+\tau) = B(x,y,t) + \tau T|\nabla B(x,y,t)| \quad (2)$$

where T is a composite driving term, and $\tau$ is a time step parameter to advance the state from time t to t+$\tau$. The method is repeated until a stopping criterion, such as convergence, is reached.

Figure 2:
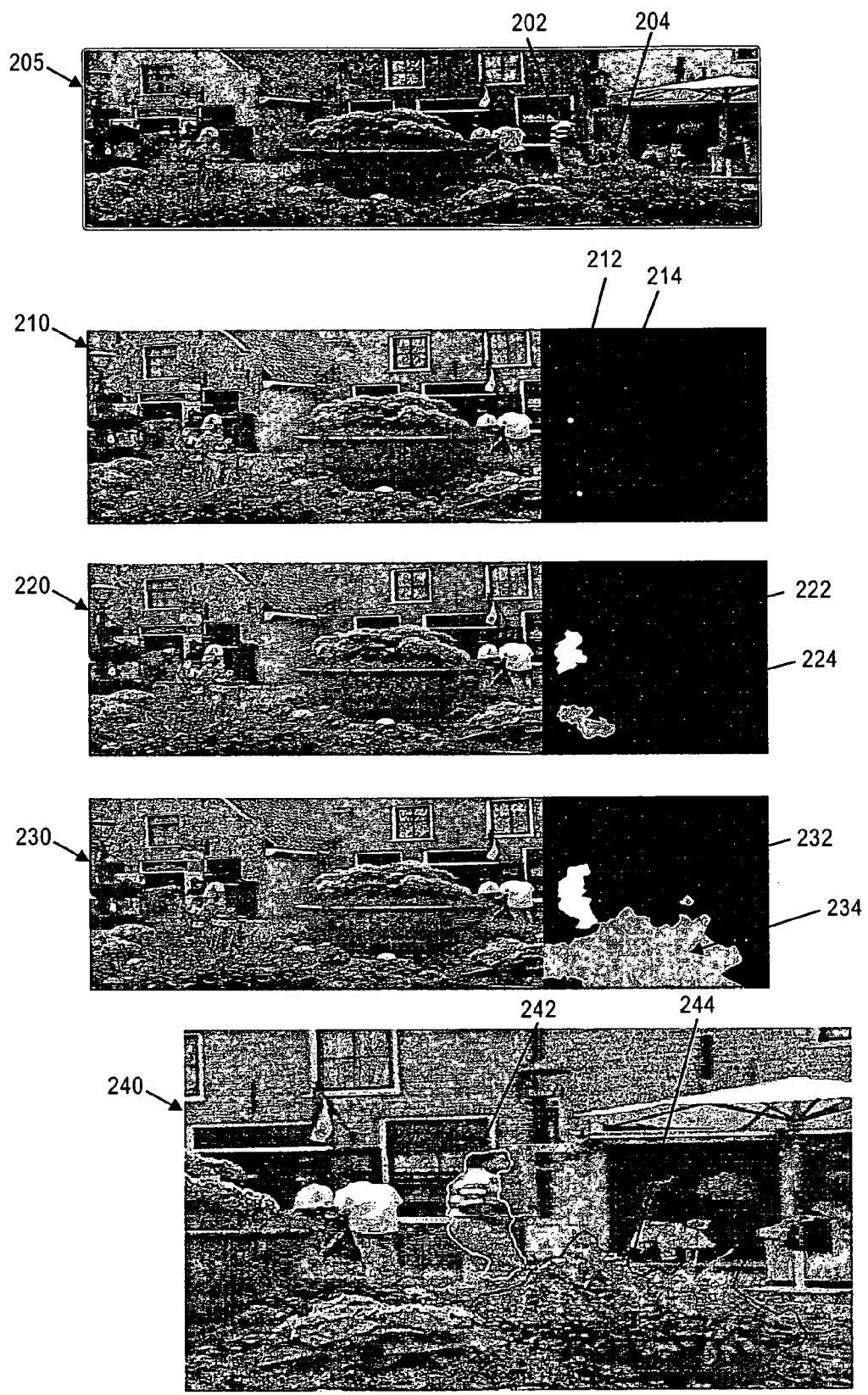
FIG. 2 shows an example of a boundary field that is grown with the dynamical model.

An example of boundary fields that are grown with the dynamical model is shown in FIG. 2. A target image is shown in block 205. To determine a boundary of object 202 in the target image 205, a seed 212 is placed in the target image, as shown in block 210. To determine a boundary of object 204, a seed 214 is placed in the target image, as shown in block 210. The boundary of seed 212 is evolved, as shown in blocks 220 and 230, to form an object region represented by the white area 222. Similarly, the boundary of seed 214 is evolved, to form an object region represented by the gray area 224. As shown in block 230, the total gray object region 234 that is determined from seed 214 has smaller portions that are not connected to the larger portion, as well as background regions within the larger portion. Similarly, the total object region 232 represented by the white area has some disconnected portions. A stability driving term, discussed below, is used to control the disconnected regions. The boundary 242 of the entire object 202 is captured, as shown in block 240.

Similarly, the boundary of seed 214 is evolved until the boundary 244 of the entire object 204 is captured.

The composite driving term T in eq. (2) is a combination of terms, such as the prediction error, stability, coupling, and template driving terms:

$$T = \lambda_1 T_{past/future\ prediction\_error} + \lambda_2 T_{stability} + \lambda_3 T_{image\_coupling} + \lambda_4 T_{template} \quad (3)$$

Each weighting value $\{\lambda_i\}$ determines the relative strength of the corresponding driving term. The past/future prediction error driving term includes the error from past and future reference image processing. This driving term is considered during a hypothesis testing method to account for occlusions and uncovered regions, as discussed below. The stability driving term $T_{stability}$ is used to ensure that B(x, y) maintains smoothness so that the extracted motion layers have a degree of compactness and the extracted moving object boundary has a degree of connectivity. The coupling driving term $T_{image\_coupling}$ is related to the spatial activity in the image. For example, an object can have correlation to local spatial activity, such as the correlation between an object boundary and an image gradient. The driving term $T_{template}$ plate considers existing knowledge about a boundary in the image, if available.

Including the expression of the driving terms from eq. (3) into the dynamical model from eq. (2) yields:

$$\partial_t B(x,y) = \quad (4)$$

$$\left( \lambda_1 T_{past/future\ prediction\_error} + \lambda_2 T_{stability} + \lambda_3 T_{image\_coupling} + \lambda_4 T_{template} \right)$$

$$|\nabla B(x,y)| = \partial_t B^1(x,y) + \partial_t B^2(x,y) + \partial_t B^3(x,y) + \partial_t B^4(x,y)$$

Past and Future Prediction Error Driving Term

The past and future prediction error driving term represents the prediction error difference between using the background motion vector or the object motion vector at some pixel location. The estimate of the background motion vector is denoted as $v_b(x, y)$ and the object motion vector is denoted as $v_o(x, y)$. This driving term is expressed as:

$$T_{past/future\ prediction\_error} = \varepsilon^2(v_b(x,y)) - \varepsilon^2(v_o(x,y)) \quad (5)$$

where $\epsilon^2(v_o)$ is the prediction error at some pixel location when the motion vector $v_o(x, y)$ is used, and $\epsilon^2(v_b)$ is the prediction error at the pixel location when the motion vector $v_b(x, y)$ is used. Placing this term in the dynamical model of eq. (3) yields the contribution of this term as:

$$\partial_t B^1(x,y) = (\epsilon^2(v_b) - \epsilon^2(v_o))|\nabla B(x,y)| \quad (6)$$

Thus, at pixel location (x, y), if the prediction error is smaller when the object motion vector is used (that is, $(\epsilon^2(v_b) - \epsilon^2(v_o))$ is positive), then B(x, y) increases since the time derivative is positive, and the pixel moves toward the object, which is expressed as pixel locations having positive values of B(x, y). Similarly, at pixel location (x, y), if the prediction error is smaller when the background motion vector is used (that is, $(\epsilon^2(v_b) - \epsilon^2(v_o))$ is negative), then B(x, y) decreases since the time derivative is negative, and the pixel moves toward the background, which is expressed as pixel locations having negative values of B(x, y).

Figure 3A:
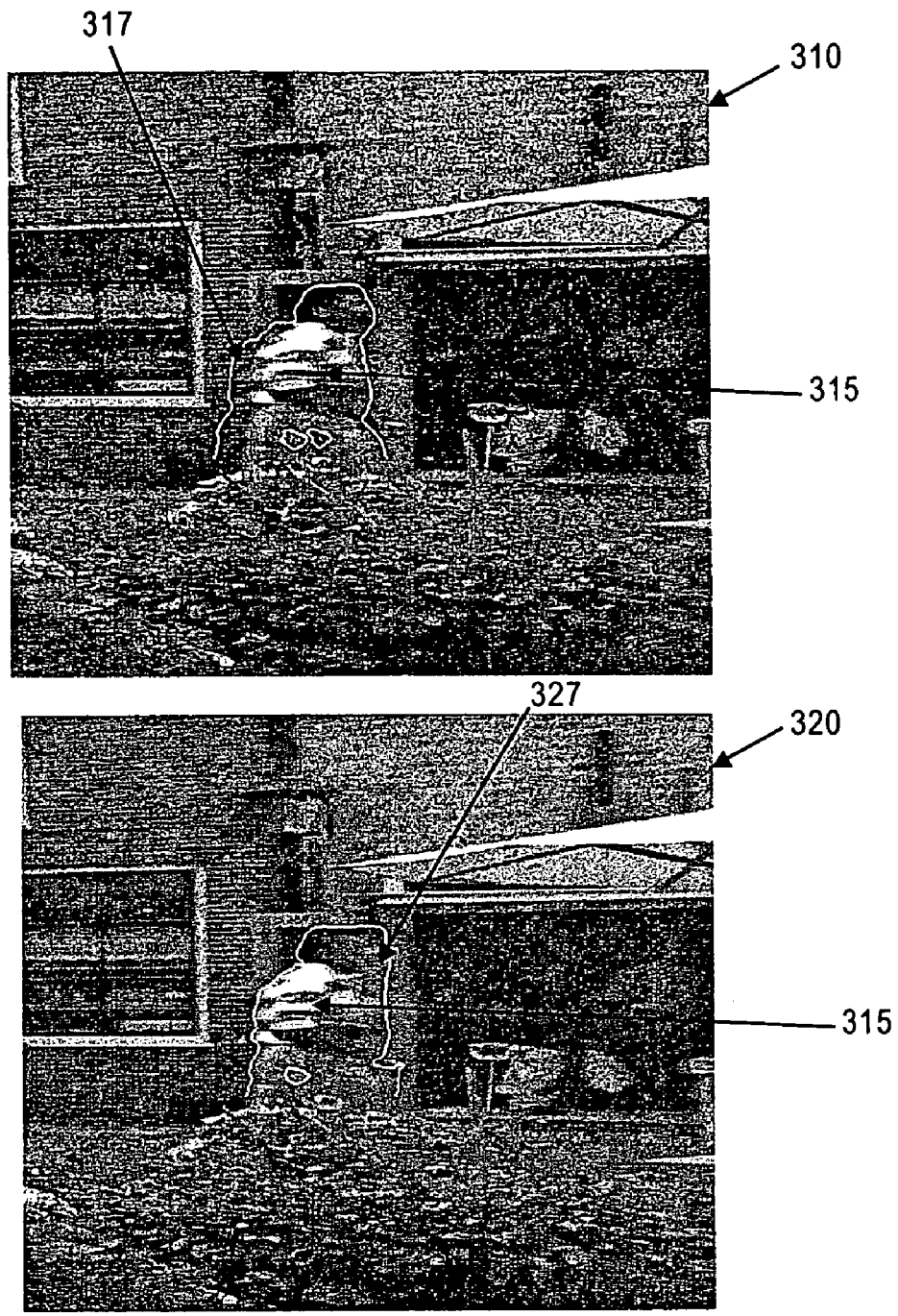
FIG. 3A shows examples of occlusions that can occur when using one reference image with the dynamical model.

The prediction error increases if an occlusion is present in the reference image. FIG. 3A shows examples of occlusions produced by the boundary extraction method when only one reference image, either past or future, is used. In block 310, the target image has an occlusion region 317, which are pixels that are covered by object 315 in a past reference image but are not covered by the object 315 in the target image. As a result of this occlusion region that is dependent on a past reference image, there is a moving object boundary that has poor correspondence to the true object boundary near occlusion region 317 because one past reference field was used to iteratively solve the dynamical model when extracting the boundary of the moving object. To avoid producing the occlusion, the future reference image should be used, if available, to predict the pixels in the occlusion region because the pixels in occlusion region 317 are not covered by the object 315 in the future reference image. Similarly, in block 320 occlusion region 327 is a region that is not covered by object 315 in the target image but is covered by the object 315 in a future reference image. The result is a moving object boundary that has poor correspondence to the true object boundary near occlusion region 327 when only one future reference field is used to iteratively solve the dynamical model when extracting the boundary of the moving object. Therefore, the past reference image, if available, should be used to predict the pixels in occlusion region 327.

Figure 3B:
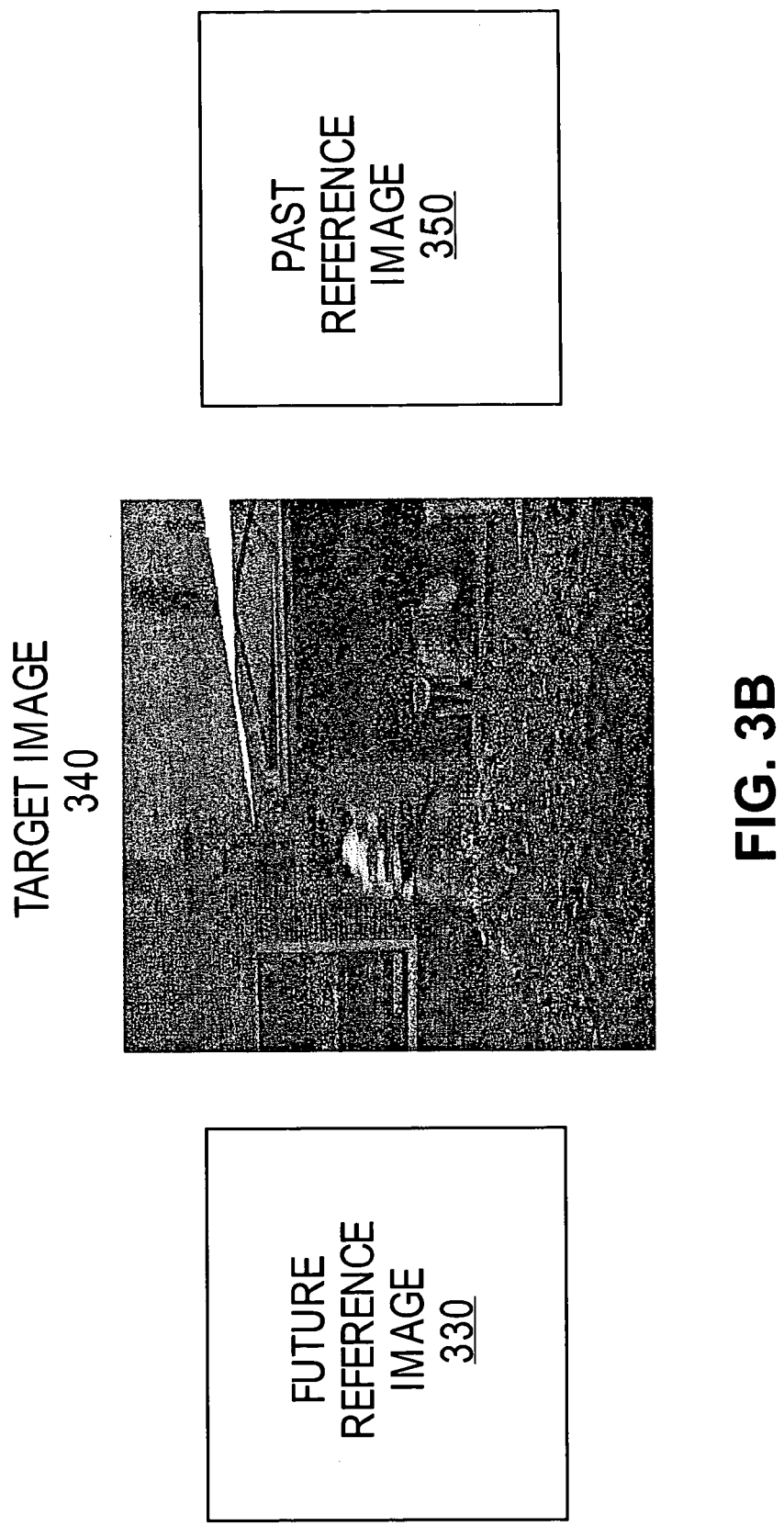
FIGS. 3B, 3C and 3D show an example of avoiding an occlusion when using multiple reference images with the dynamical model.
Figure 3C:
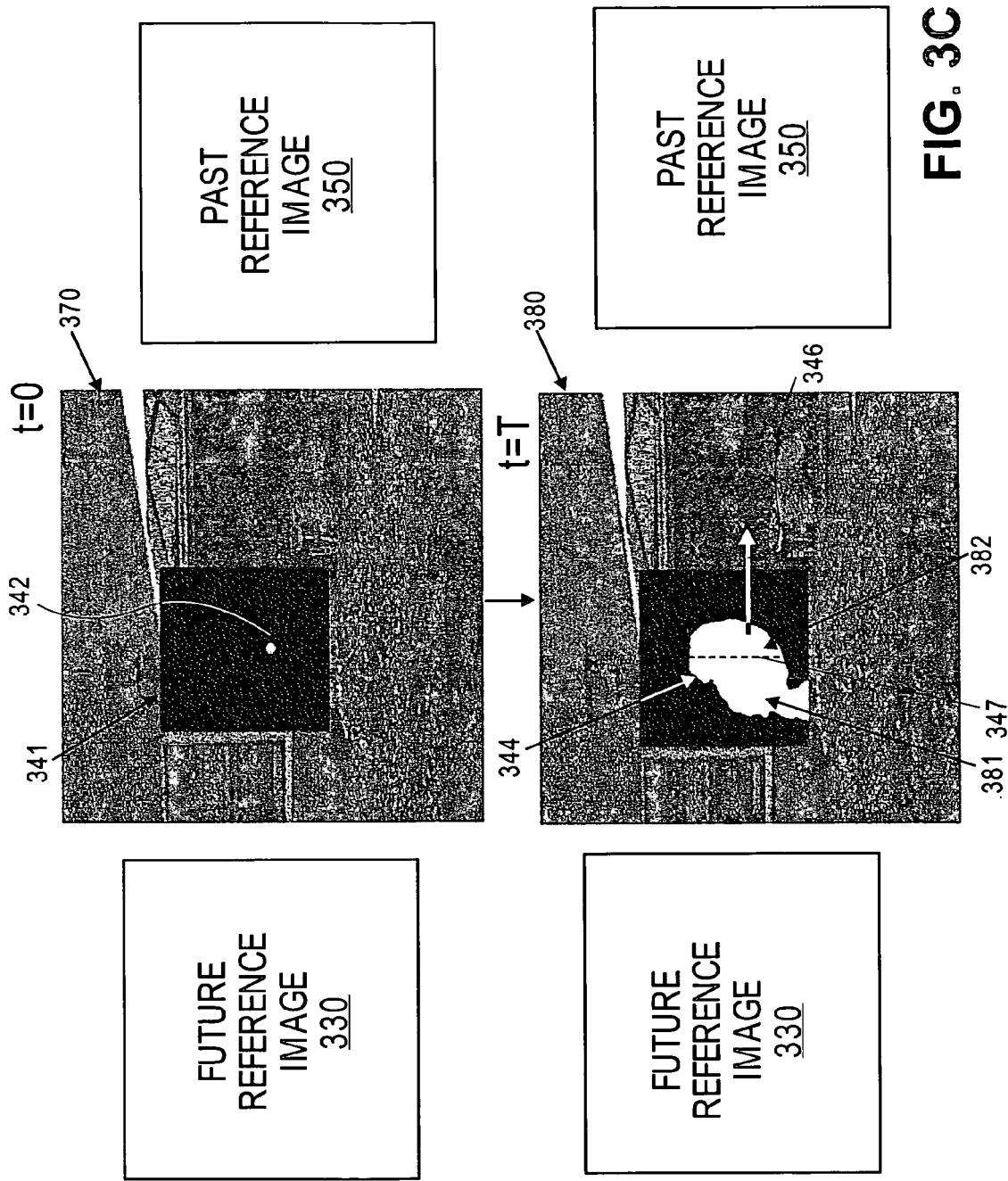
Figure 3D:

The occlusion regions shown in FIG. 3A can be avoided by using both past and future reference images when extracting the moving object boundary, as shown in FIGS. 3B, 3C, and 3D. In order to handle occlusion, past and future motion information is used. At any time in the iteration of the dynamical mode, the growth state of the object and the motion of object and background are used to determine which pixels should use past or future reference image for motion estimation. As shown in FIG. 3B, future reference image 330 and past reference image 350 are used to extract the boundary of a moving object in target image 340. As shown in FIG. 3C, the dynamical model is initialized in the black region 341 of block 370 to produce a background region, represented by the black square, and a seed 342 within the boundary of the moving object. As shown in block 380, the dynamical model is iteratively solved to extend the boundary of the moving object to produce moving object region 344. The moving object has a motion vector 346 that shows the motion of the object is directed towards the right side of the target image. Therefore, to avoid producing an occluded region, the dynamical model uses the future reference image 330 to estimate motion vectors and prediction error for the region 381 to the left of dotted line 347, and the model uses past reference image 350 to estimate motion vectors and prediction error for the region 382 to the right of dotted line 347. In some embodiments, a determination to use either the past reference image or the future reference image is made at each pixel by performing a hypothesis test for background and object motion vectors, as explained below. The final result is shown in FIG. 3D, as extracted boundary 349, represented by the white lines around the object, which is produced without an occluded region and hence has better quality extraction.

Figure 4:
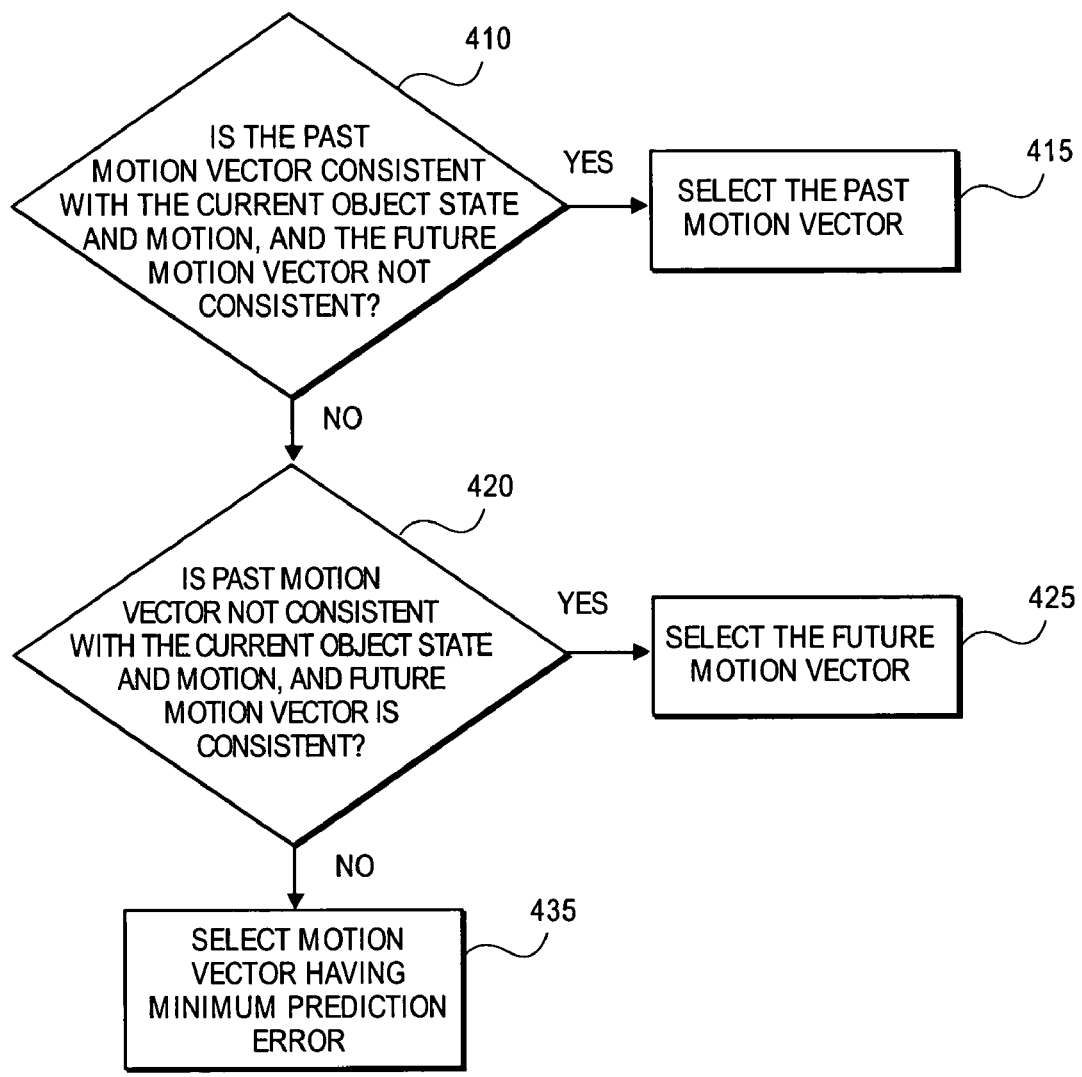
FIG. 4 shows an example of a method for generating a hypothesis for the background motion field.

A more detailed pixel-wise decision on whether to use past or future reference field is made by extending the prediction error driving term as follows:

$$\partial_t B^1(x,y) = (\epsilon^2(v_b^{hyp}) - \epsilon^2(v_o^{hyp})) |\nabla B(x,y)| \quad (7)$$

where $v^{hyp}$ denotes the hypothesis for the motion vector at pixel location (x,y). The hypothesis test for the background motion vector is performed as shown in FIG. 4. The motion vector for the object, using a past or a future reference image, is denoted as either: $v_o^{past}(x, y)$, or $v_o^{future}(x, y)$. The motion vector for the background, using a past or a future reference image, is denoted as either: $v_b^{past}(x, y)$, or $v_b^{future}(x, y)$. At 410, if the motion vector $v_b^{past}$ is consistent with a current object state and motion, and $v_b^{future}$ is not consistent, then at 415 select $v_b^{past}$. Otherwise, at 420, if motion vector $v_b^{past}$ is not consistent with the current object state and motion, and $v_b^{future}$ is consistent, then at 425 select $v_b^{future}$. Otherwise, if both motion vectors are consistent, then at 435 select the motion vector with the minimum prediction_error, $$v_b^{hyp}(x,y) = \min_v(\epsilon^2(v = v_b^{past}), \epsilon^2(v = v_b^{future})).$$

Figure 5:
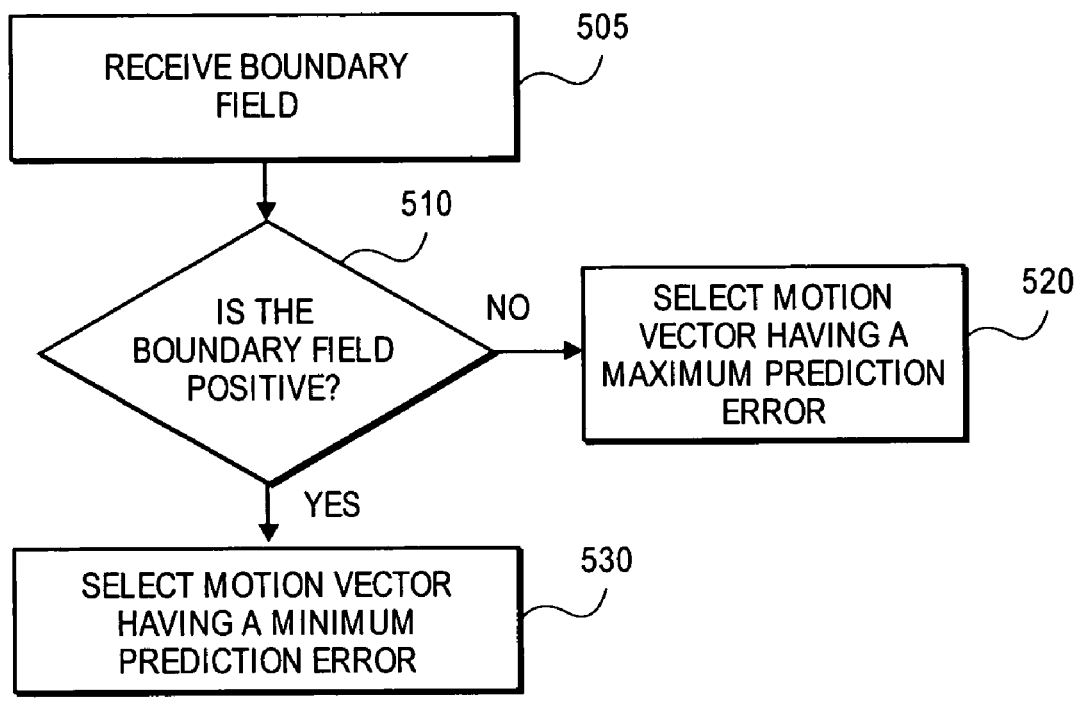
FIG. 5 shows an example of generating a hypothesis for the object motion field.

The hypothesis test for the foreground object motion vector is performed as shown in FIG. 5. At 505, a value for the boundary field B(x,y) is received. At 510, determine if B(x, y)≧S. If so, then at 520, select $v_o^{hyp} = \min_v(\epsilon(v = v_o^{past}), \epsilon(v = v_o^{future}))$. If not, then at 530, select $v_o^{hyp} = \max_v(\epsilon(v = v_o^{past}), \epsilon(v = v_o^{future}))$. Thus, if the current state at pixel (x,y) has a value such that B(x, y)≧S, which means that the pixel is likely within the object, then the method uses $v_o^{hyp} = \min_v(\epsilon(v = v_o^{past}), \epsilon(v = v_o^{future}))$ to select a smaller prediction error for the object motion vector, which favors object growth. On the other hand, if the current state at pixel (x,y) has a value where B(x, y)<S, which means that the pixel is more likely in the background, then the method uses $v_o^{hyp} = \max_v(\epsilon(v = v_o^{past}), \epsilon(v = v_o^{future}))$ to select a larger prediction error for the object motion vector in order to favor background growth.

In this example, the parameter S is set it to 0, since object and background are separated by the zero values of B(x, y). The hypothesis selection of the object or background motion vector uses past and future reference image information, along with current object state information, to better handle the occlusion.

Stability Driving Term

The stability driving term allows for a compact, stable structure to emerge from the nonlinear model, and the term is expressed as:

$$T_{stability} = -\nabla \cdot \hat{n} \quad (8)$$

where $\hat{n}$ is the normal vector for the boundary field, defined as:

$$\hat{n}(x,y) = -\frac{\nabla B(x, y)}{|\nabla B(x, y)|}$$

which is the direction normal to the curve where B(x, y)=constant. Placing this term in eq. (3) yields:

$$\partial_t B^2(x,y) = -(\nabla \cdot \hat{n}) |\nabla B(x,y)| \quad (9)$$

Thus, if the contour of the object near the boundary, where |∇B(x, y)| is nonzero, has a positive curvature (i.e., an outward shape from the positive region), then $\nabla \cdot \hat{n}$ is positive, and B(x, y) decreases to straighten the curve. Similarly, if the contour of the object near the boundary, where |∇B(x, y)| is nonzero, has a negative curvature (i.e., an inward shape from the positive region), then $\nabla \cdot \hat{n}$ is negative, and B(x, y) increases to straighten the curve.

Figure 6:
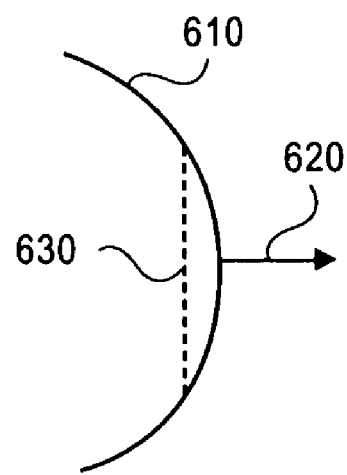
FIG. 6 shows an example of a portion of a boundary field and normal vector.

The stability driving term controls the degree of curvature of the object boundary topology. This term acts as a diffusion term that reduces the length of the contour. FIG. 6 shows an example of a portion of a boundary field 610 and normal vector 620. The stability driving term straightens the contour of the boundary field, as shown by dashed line 630. An explicit diffusion term can also be added to eq. (9) to more directly control the removal (i.e., diffusion) of small positive or negative regions, as shown in eq. (10):

$$\partial_t B^2(x,y) = -(\nabla - \hat{n})|\nabla B(x,y)| - \nabla^2 B(x,y) \quad (10)$$

The Laplacian term on the right of eq. (10) causes the Boundary field to be relatively smooth and homogeneous.

Image Coupling Driving Term

The moving object boundary may have a correlation to some local spatial image activity. For example, often an object boundary has an intensity gradient normal to the boundary. This type of local spatial activity correlation is incorporated into the model using the image coupling driving term:

$$T_{image\_coupling} = \nabla \cdot (\hat{n}|\nabla I(x,y)|) \quad (11)$$

where $\hat{n}$ is the normal to the boundary field, and $|\nabla I(x, y)|$ is the magnitude of the image intensity gradient. Placing this term in eq. (3) yields the contribution of this factor as:

$$\partial_t B^3(x,y) = (\nabla \cdot (\hat{n}|\nabla I(x,y)|))|\nabla B(x,y)| \quad (12)$$

Figure 7:
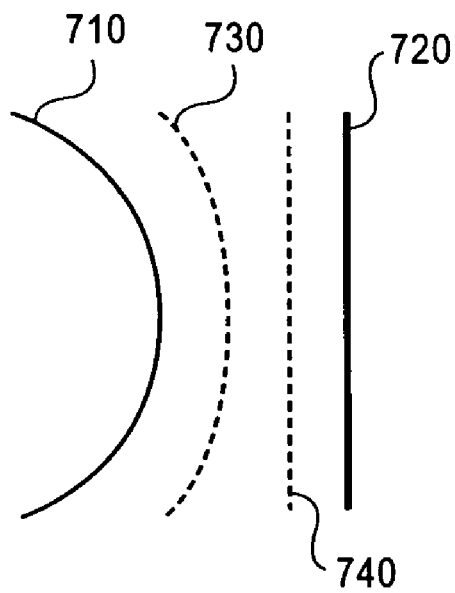
FIG. 7 shows an example of the effects of the image coupling driving term.

Thus, if an image gradient is near the object boundary width, then the boundary aligns along the image gradient. FIG. 7 shows an example of the effects of the image coupling driving term. A portion of a boundary curve 710 is close to an image structure 720, such as a local peak in an intensity gradient. The image coupling driving term attracts the boundary to the image structure, as shown by curved line 730 and dashed line 740.

Template Driving Term

The template driving term is used, for instance, in an embodiment that learns information about the objects in the scene from previous sequences, or that has prior information about the expected shape of an object. This information provides a template for the object boundary. The object boundary template driving factor may be characterized by the crossing point of a two-dimensional function $\tilde{B}_{template}(x, y)$. The template driving term is expressed as:

$$\partial_t B^4(x,y) = -(B(x,y) - \tilde{B}_{template}(x,y))|\nabla B(x,y)| \quad (13)$$

Thus, if the boundary field B(x, y) is larger than the template $\tilde{B}_{template}(x, y)$ at a pixel position near the object boundary, then B(x, y) decreases. Similarly, if the boundary field B(x, y) is smaller than the template $\tilde{B}_{template}(x, y)$ at a pixel position near the object boundary, then B(x, y) increases. Eventually, an equilibrium is reached where B(x, y)~$\tilde{B}_{template}(x\ y)$.

The dynamical model evolves the spatial two-dimensional boundary field B(x, y) according to eq. (4). The parameters $\{\lambda_1, \lambda_2, \lambda_3\}$ determine the relative weights of each term. In some embodiments, $\lambda_3$ is initially set to 0 and slowly increases so that it becomes more effective in later stages of the growth of the object boundary. Often, $\lambda_4$ is set to 0 for the entire method because no prior knowledge about the object boundary is available. The driving terms are functions of the boundary field B(x, y) and the motion field. The nonlinear cooperative effects of the driving terms allow for a stable evolution and emergence of the boundary field for the moving object.

As the boundary field is updated in the dynamical model, the prediction error between using the background and object motion for each pixel "x" needs to be computed at every iteration. The background motion is usually very robust and stable, and so a single background motion may be used for all pixels. In some instances, however, the object motion may involve non-local or non-rigid motion. In these instances, bulk and local/boundary motion vectors for the object motion are used in some embodiments.

Figure 8:
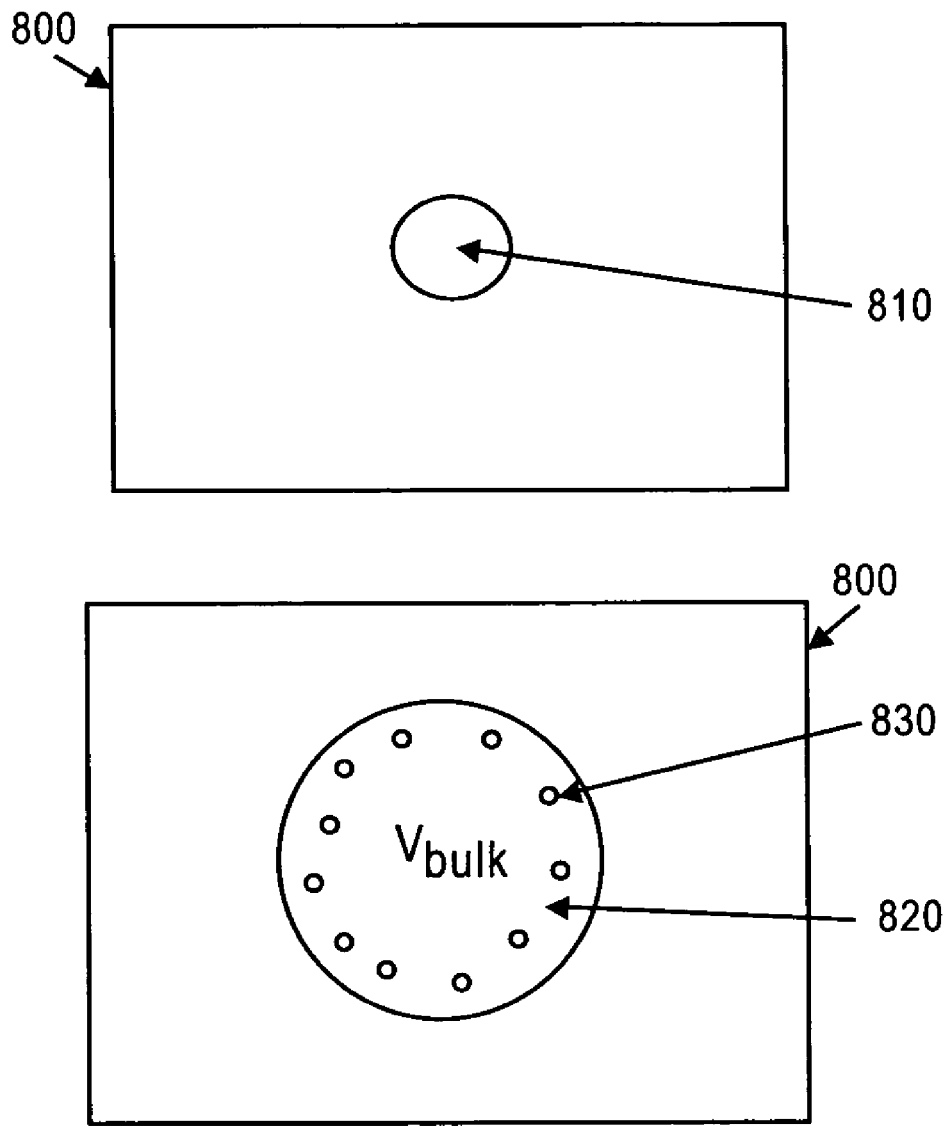
FIG. 8 shows an example of an emerging boundary field for an object and illustrates local boundary motion vectors.

FIG. 8 shows an example of an emerging boundary field for an object. At time $t_1$, the identified portion of the object in target image 800 is shown at 810, and the rest of the target image is considered background region. As the boundary field evolves at time $t_2$, the identified portion of the object grows as shown at 820. Boundary motion vectors 830 are placed along the boundary of the moving object, and values for the motion vectors are estimated. The values of the boundary motion vectors are determined using pixels that are identified as part of the object at the current time $t_2$. That is, only pixels inside the identified portion of the object 820 are used to estimate the boundary motion vectors 830. Each boundary motion vector is estimated using a region inside of the identified portion of the object, within a predetermined distance from the boundary. Each boundary motion vector therefore indicates motion of a small portion of the object. A bulk motion vector for the object, $v_{bulk}$, is estimated using pixels from the identified portion to indicate the overall motion of the entire object.

Generally, the bulk motion vector $v_{bulk}$ can be used to represent the object motion for each pixel in the object. For a pixel along the boundary, a boundary motion vector that is near, or has local spatial correlation with, the pixel can be used to represent the object motion, in order to handle non-rigid motion in which several parts of the object move in different directions. For example, if an object is a person, a bulk motion vector can indicate that the person is moving to the right, and a boundary motion vector along a hand of the person can indicate that the hand is moving to the left relative to the bulk motion vector.

Figure 9:
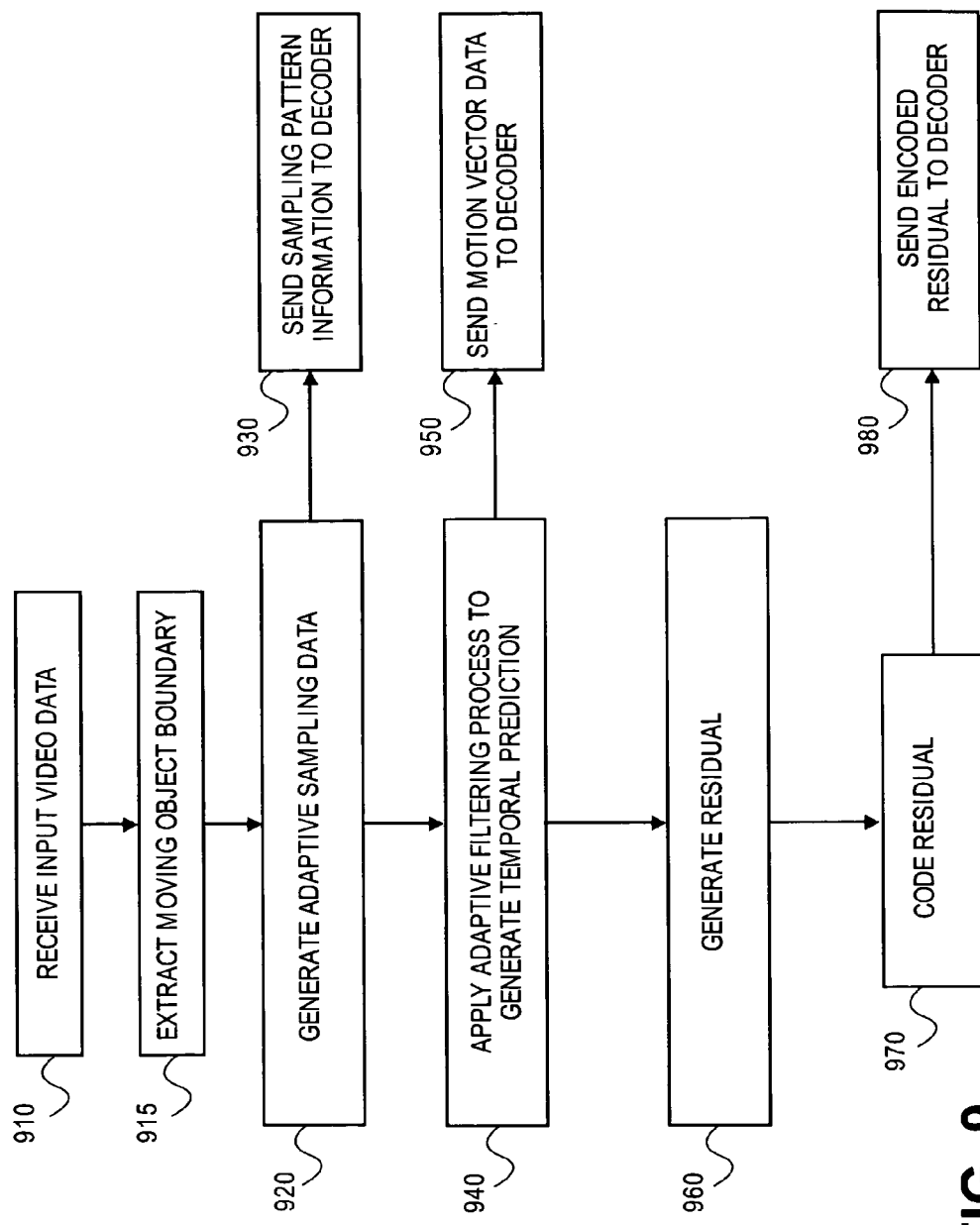
FIG. 9 shows an example of video coding for encoding an image (or frame, or field) of video data that uses the method of extracting a moving object boundry.

In one embodiment, the boundary extraction method is used in video coding for encoding an image (or frame, or field) of video data, as shown in FIG. 9. At 910, the encoder receives an input target image. A set of reference images, which contain decoded image data related to the target image, is available to the encoder during the encoding process, and also to the decoder during the decoding process. At 915, moving object boundaries are extracted. At 920, the encoder generates an irregular sampling, or distribution, of motion vectors associated with the target image. At 930, the sampling pattern information (e.g., bits to represent the pattern) is transmitted to a decoder.

At 940, a temporal prediction filtering process is applied to the irregular motion sampling pattern. This adaptive filtering process uses the motion vectors, irregular sampling pattern, and reference images to generate a prediction of the target image. At 950, the motion vector values are coded and sent to the decoder. At 960, a residual is generated, which is the actual target data of the target image minus the prediction error from the adaptive filtering process. At 970, the residual is coded and at 980 is sent to the decoder.

In another embodiment, the adaptive sampling pattern of motion vectors is used in decoding a image (or frame, or image) of video data, as shown in FIG. 10. At 1010, an encoded residual is received. At 1020, the decoder decodes the received encoded residual. At 1030, the decoder receives the sample pattern information, reference images, and motion vector values. Then, at 1040 the decoder applies the adaptive temporal filter procedure to generate the temporal prediction. At 1050, the decoded target image is generated by adding the decoded residual to the temporal prediction.

FIG. 11 shows an example of a system that uses the adaptive area of influence filter. A digital video camera 1110 captures images in an electronic form, and processes the images using compression device 1120, which uses the motion vector selection method during the compression and encoding process. The encoded images are sent over an electronic transmission medium 1130 to digital playback device 1140. The images are decoded by decoding device 1150, which uses the filter during the decoding process. Camera 1110 is illustrative of various image processing apparatuses (e.g., other image capture devices, image editors, image processors, personal and commercial computing platforms, etc.) that include embodiments of the invention. Likewise, decoding device 1150 is illustrative of various devices that decode image data.

While the invention is described in terms of embodiments in a specific system environment, those of ordinary skill in the art will recognize that the invention can be practiced, with modification, in other and different hardware and software environments within the spirit and scope of the appended claims.

The invention claimed is:

1. A method carried out by an electronic data processor, comprising the acts of:
   estimating an initial motion vector for an object whose motion is represented by a change in position between a target image and a reference image;
   estimating an initial vector for a background area over which the object appears to move;
   computing, by the electronic data processor, at least one iteration of a dynamical model comprising a prediction error estimation process using the estimated vectors, wherein if a pixel in the target image is proximate to an estimated occluded area relative to the future reference frame, using a past reference frame to estimate the prediction error and otherwise if the pixel in the target image is proximate to an estimated occluded area relative to the past reference frame, using a future reference frame to estimate the prediction error and
   using a hypothesis testing procedure for an object motion field,
   wherein if a pixel in the target image has a corresponding value in a boundary field that is greater than or equal to a threshold, then an object hypothesis is an object motion vector with a smaller prediction error from a past image object motion vector and a future image object motion vector and
   otherwise if the pixel in the target image has a corresponding value
   in the boundary field that is less than the threshold, then the object hypothesis is the object motion vector with the larger prediction error from the past image object motion vector and the future image object motion vector; and
   extracting a boundary of the object using the at least one iteration of the dynamical model.

2. The method of claim 1,
   wherein the dynamical model comprises a prediction error term;
   wherein the prediction error term comprises a difference between a prediction error obtained by using a motion vector associated with the object and a prediction error obtained by using a motion vector associated with the background area.

3. The method of claim 1,
   wherein the dynamical model comprises a stability term;
   wherein the stability term comprises a curvature term associated with extracting a curvature of the boundary; and
   wherein the stability term comprises a diffusion term associated with extracting a smoothness or compactness of the moving object.

4. The method of claim 1,
   wherein the dynamical model comprises an image coupling term;
   wherein the image coupling term is associated with an intensity gradient normal to the object boundary; and
   wherein the intensity gradient is associated with a portion of the target image proximate the object.

5. The method of claim 1,
   wherein the dynamical model comprises a template term; and
   wherein the template term provides a template for the moving object boundary.

6. The method of claim 1, wherein the prediction error estimation process further comprises a hypothesis testing procedure for the background motion field, the hypothesis testing procedure being:
   testing a first background motion field for consistency with a current state of the object, wherein the first background motion field is based on a past reference frame;
   testing a second background motion field for consistency with the current state of the object, wherein the second background motion field is based on a future reference frame; and
   using the results of the testings to select either the first or the second background field.

7. The method of claim 1, wherein the hypothesis testing procedure for the object motion field is represented by the equation:

if $B(x,y) \geq S$, then select $v_o^{hyp} = \min_v(\epsilon(v_o^{past}), \epsilon(v=v_o^{future}))$, or else select $v_o^{hyp} = \max_v(\epsilon(v=v_o^{past}), \epsilon(v=v_o^{future}))$;

wherein $v_o^{past/future}$ comprises a motion vector for the object based on past or future reference field, $\epsilon$ comprises the prediction error, $v_o^{hyp}$ comprises a hypothesis for the motion vector, S comprises a threshold value, and $B(x,y)$ comprises a boundary field state at pixel $(x,y)$.

8. The method of claim 1, wherein the dynamical model comprises:

$B(x,y,t+\tau) = B(x,y,t) + \tau T |\nabla B(x,y,t)|$;

wherein $B(x,y,t)$ comprises a state of the boundary field at pixel $(x,y)$ at time t that defines for every pixel $(x,y)$ an object or background state at time t, $\nabla$ comprises a gradient of the boundary field, T comprises a composite driving term to combine effects from a plurality of boundary features, and $\tau$ comprises a time step parameter to advance a state from time t to $t+\tau$.

9. The method of claim 8, wherein T comprises:

$$T = \lambda_1 T_{past/future\ prediction\_error} + \lambda_2 T_{stability} + \lambda_3 T_{image\_coupling} + \lambda_4 T_{template};$$

wherein $\lambda_1, \lambda_2, \lambda_3, \lambda_4$ comprise weighting factors, $T_{past/future\ prediction\_error}$ comprises a prediction error term, $T_{stability}$ comprises a stability term, $T_{image\_coupling}$ comprises an image coupling term and $T_{template}$ comprise a template term.

10. The method of claim 1, further comprising:
    estimating a second motion vector for the object after completing a particular number of iterations of the dynamical model solution; and
    estimating a second motion vector for the background area after completing the particular number of iterations of the dynamical model solution.

11. The method of claim 10, wherein estimating the second motion vectors for the object and for the background area comprises:
    estimating a bulk motion vector and a local boundary motion vector, wherein the bulk motion vector and the local boundary motion vector represent movement of the object; and
    using the estimated local boundary motion vector to compute the prediction error term in the dynamical model for pixels proximate regions in the object that have non-rigid motion.

12. An apparatus comprising:
    a microprocessor that
    estimates an initial motion vector for an object whose motion is represented by a change in position between a target image and a reference image;
    estimates an initial vector for a background area over which the object appears to move;
    computes at least one iteration of a dynamical model comprising a prediction error estimation process using the estimated vectors, wherein
        if a pixel in the target image is proximate to an estimated occluded area relative to the future reference frame, using a past reference frame to estimate the prediction error and
        otherwise if the pixel in the target image is proximate to an estimated occluded area relative to the past reference frame using a future reference frame to estimate the prediction error and
    using a hypothesis testing procedure for an object motion field,
        wherein if a pixel in the target image has a corresponding value in a boundary field that is greater than or equal to a threshold, then an object hypothesis is an object motion vector with a smaller prediction error from a past image object motion vector and a future image object motion vector and
        otherwise if the pixel in the target image has a corresponding value in the boundary field that is less than the threshold, then the object hypothesis is the object motion vector with the larger prediction error from the past image object motion vector and the future image object motion vector; and
    extracts a boundary of the object using the at least one iteration of the dynamical model.

13. The apparatus of claim 12,
    wherein the dynamical model comprises a prediction error term;
    wherein the prediction error term comprises a difference between a prediction error obtained by using a motion vector associated with the object and a prediction error obtained by using a motion vector associated with the background area.

14. The apparatus of claim 12,
    wherein the dynamical model comprises a stability term;
    wherein the stability term comprises a curvature term associated with extracting a curvature of the boundary; and
    wherein the stability term comprises a diffusion term associated with extracting a smoothness or compactness of the moving object.

15. The apparatus of claim 12,
    wherein the dynamical model comprises an image coupling term;
    wherein the image coupling term is associated with an intensity gradient normal to the object boundary; and
    wherein the intensity gradient is associated with a portion of the target image proximate the object.

16. The apparatus of claim 12,
    wherein the dynamical model comprises a template term; and
    wherein the template term provides a template for the moving object boundary.

17. The apparatus of claim 12, wherein the prediction error estimation process comprises a hypothesis testing procedure for the background motion field, the hypothesis testing procedure being:
    testing a first background motion field for consistency with a current state of the object, wherein the first background motion field is based on a past reference frame;
    testing a second background motion field for consistency with the current state of the object, wherein the second background motion field is based on a future reference frame; and
    using the results of the testing to select either the first or the second background field.

18. The apparatus of claim 12, wherein the hypothesis testing procedure for the object motion field is represented by the equation:

if $B(x,y) \geq S$, then select $v_o^{hyp} = \min_v(\epsilon(v=v_o^{past}), \epsilon(v_o^{future}))$, or else select $v_o^{hyp} = \max_v(\delta(v=v_o^{past}), \epsilon(v=v_o^{future}))$;

wherein $v_o^{past/future}$ comprises a motion vector for the object based on past or future reference field, $\epsilon$ comprises the prediction error, $v_o^{hyp}$ comprises a hypothesis for the motion vector, S comprises a threshold value, and B(x,y) comprises a boundary field state at pixel (x,y).

19. The apparatus of claim 12, wherein the dynamical model comprises:

$B(x,y,t+\tau) = B(x,y,t) + \tau T |\nabla B(x,y,t)|$;

Wherein B(x,y,t) comprises a state of the boundary field at pixel (x,y) at time t, $\nabla$ comprises a gradient of the boundary field, T comprises a composite driving term to combine effects from a plurality of boundary features, and $\tau$ comprises a time step parameter to advance a state from time t to t+$\tau$.

20. The apparatus of claim 12, wherein T comprises:

$T = \lambda_1 T_{past/future\ prediction\_error} + \lambda_2 T_{stability} + \lambda_3 T_{image\_coupling} + \lambda_4 T_{template}$;

wherein $\lambda_1, \lambda_2, \lambda_3, \lambda_4$ comprise weighting factors $T_{past/future\ prediction\_error}$ comprises a prediction error term, $T_{stability}$ comprises a stability term, $T_{image\_coupling}$ comprises an image coupling term and $T_{template}$ comprises a template term.

21. The apparatus of claim 12, wherein the microprocessor estimates a second motion vector for the object after completing a particular number of iterations of the dynamical model solution; and estimates a second motion vector for the background area after completing the particular number of iterations of the dynamical model solution.

22. The apparatus of claim 21, wherein the microprocessor estimates the second motion vectors for the object and for the background area by estimating a bulk motion vector and a local boundary motion vector, wherein the bulk motion vector and the local boundary motion vector represent movement of the object, and using the estimated local boundary motion vector to compute the prediction error term in the dynamical model for pixels proximate regions in the object that have non-rigid motion.

* * * * *

UNITED STATES PATENT AND TRADEMARK OFFICE
CERTIFICATE OF CORRECTION

PATENT NO. : 7,596,243 B2 Page 1 of 1
APPLICATION NO. : 11/229285
DATED : September 29, 2009
INVENTOR(S) : Paniconi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 959 days.

Signed and Sealed this

Twenty-eighth Day of September, 2010

David J. Kappos
*Director of the United States Patent and Trademark Office*